No. 880,647. PATENTED MAR. 3, 1908.
K. B. FLETCHER.
PAPER FEEDER ELEVATOR.
APPLICATION FILED AUG. 4, 1905.

6 SHEETS—SHEET 1.

Witnesses:
A. C. Ratigan
E. Batchelder

Inventor:
Kimball B. Fletcher,
by Wright Brown Quinby & May
Attorneys.

No. 880,647. PATENTED MAR. 3, 1908.
K. B. FLETCHER.
PAPER FEEDER ELEVATOR.
APPLICATION FILED AUG. 4, 1905.

6 SHEETS—SHEET 3.

Witnesses:
A. C. Ratigan
E. Batcheller

Inventor:
Kimball B. Fletcher,
by Wright Brown Quinby & May
Attorneys.

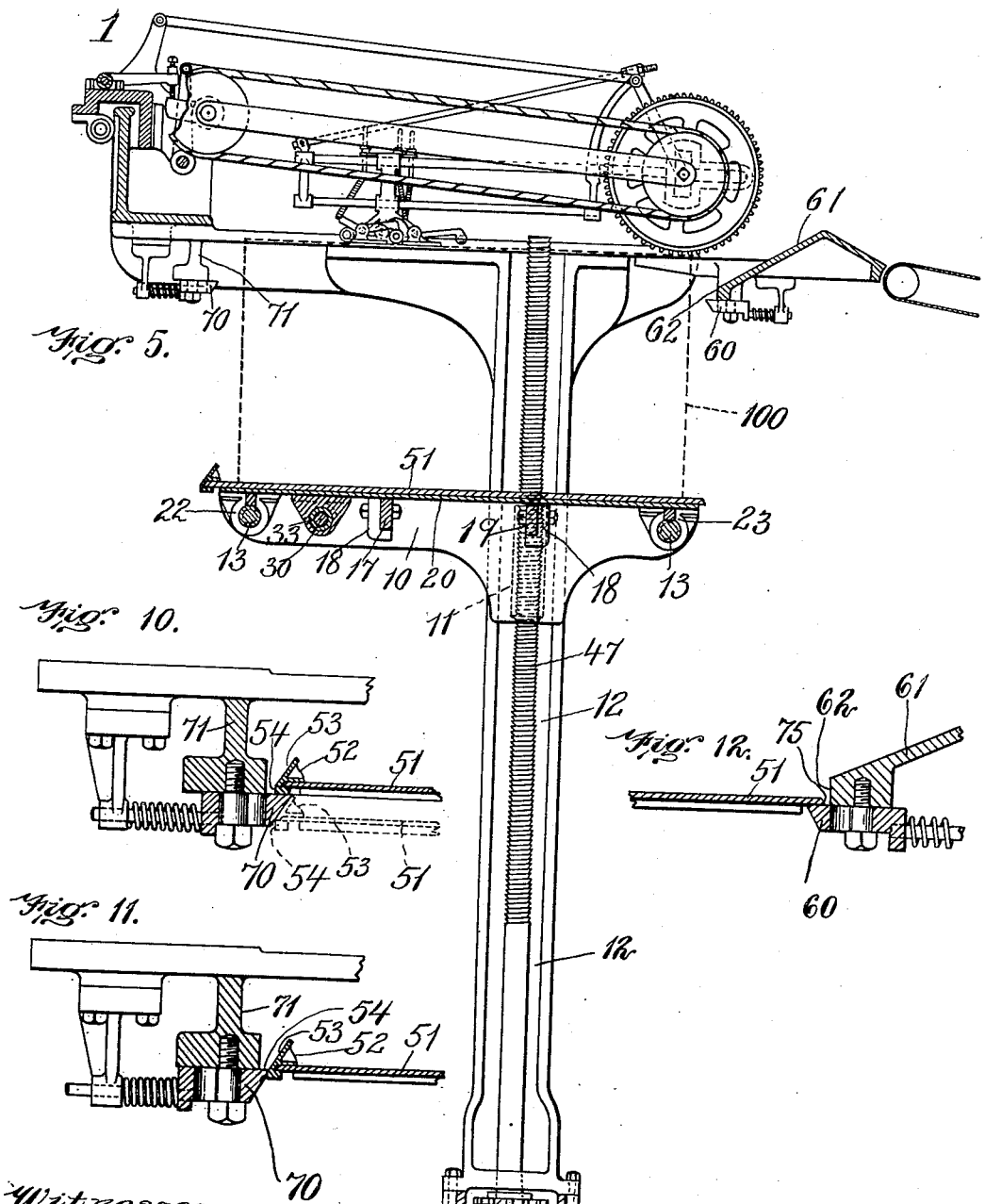

No. 880,647. PATENTED MAR. 3, 1908.
K. B. FLETCHER.
PAPER FEEDER ELEVATOR.
APPLICATION FILED AUG. 4, 1905.
6 SHEETS—SHEET 5.
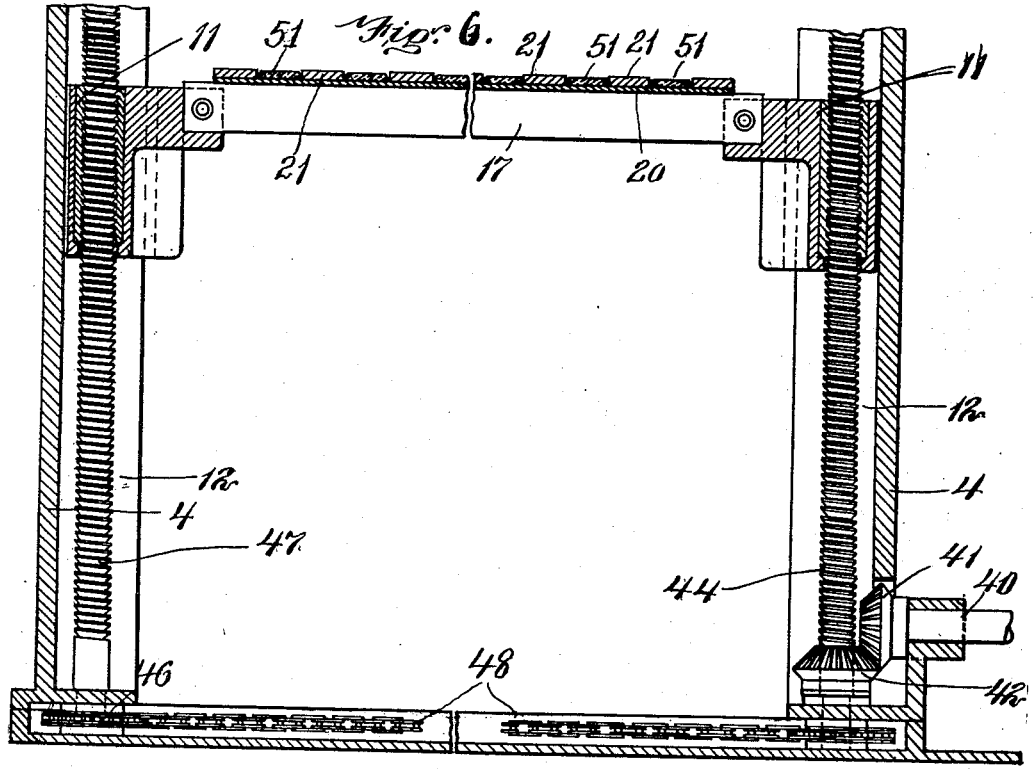
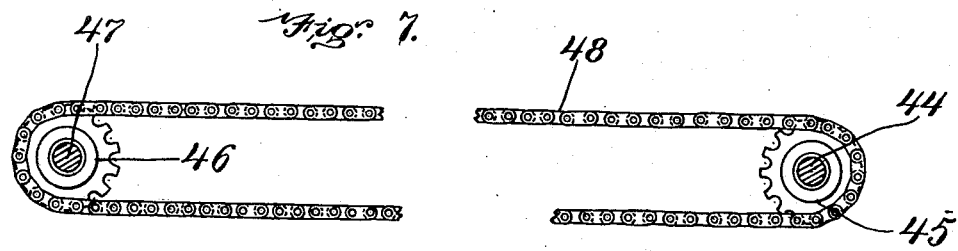
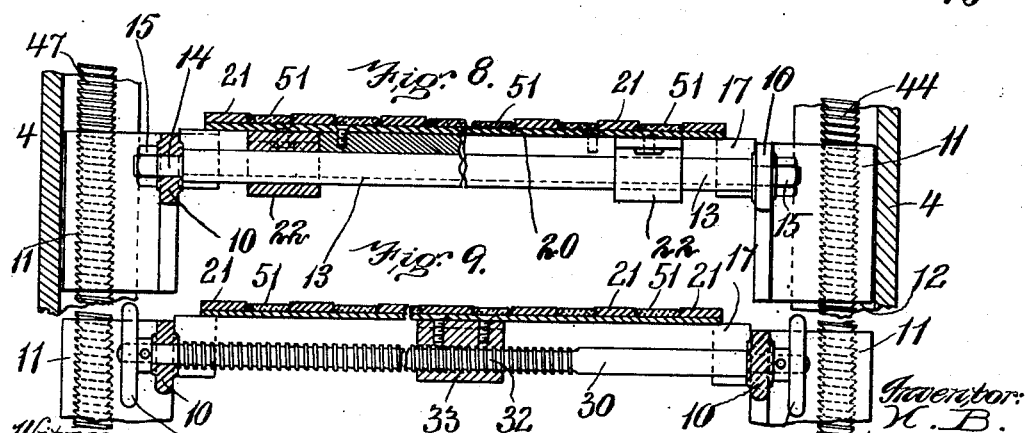

No. 880,647.  PATENTED MAR. 3, 1908.
K. B. FLETCHER.
PAPER FEEDER ELEVATOR.
APPLICATION FILED AUG. 4, 1905.
6 SHEETS—SHEET 6.
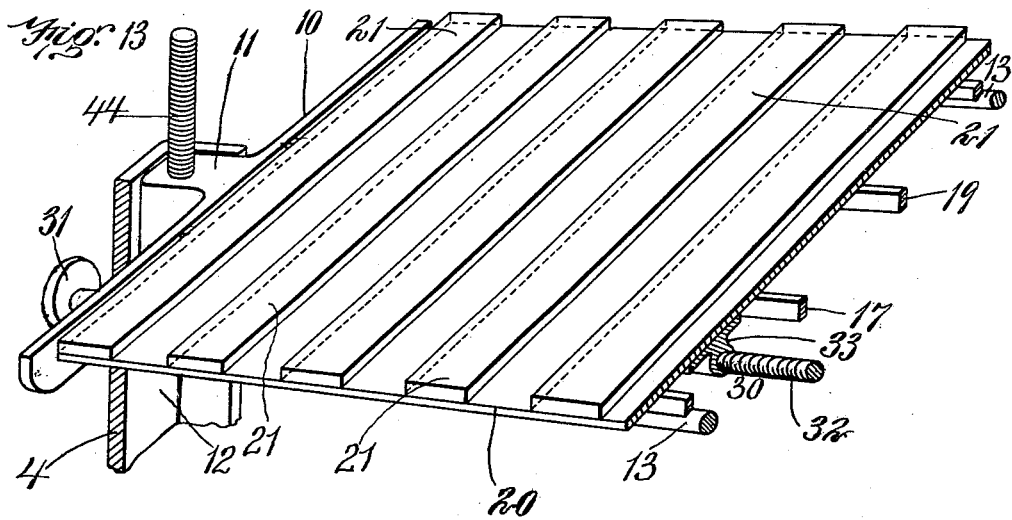
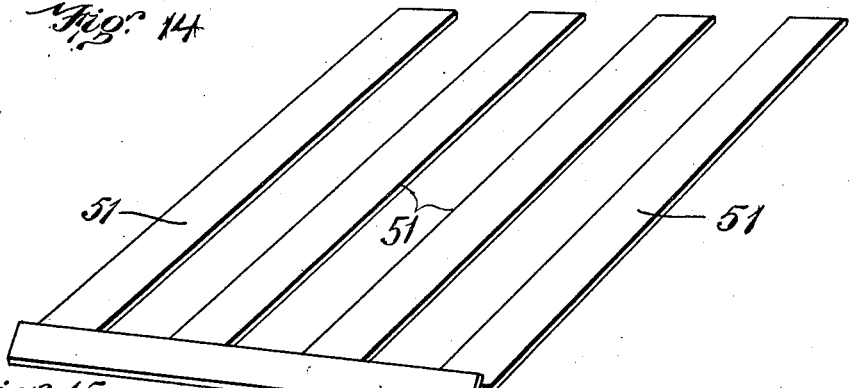
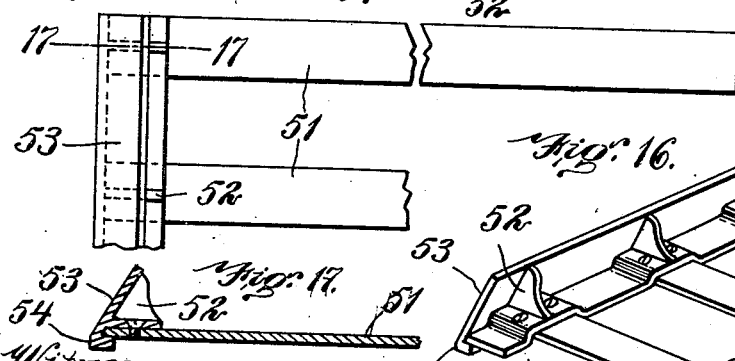
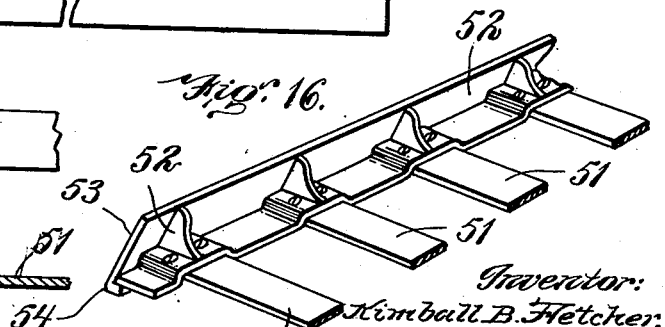
Witnesses:
A. C. Ratigan
E. Batchelder
Inventor:
Kimball B. Fletcher
by Wright Brown Quinby & May
Attorneys.

UNITED STATES PATENT OFFICE.

KIMBALL BROWN FLETCHER, OF LANCASTER, NEW HAMPSHIRE, ASSIGNOR TO UNITED PRINTING MACHINERY COMPANY, OF BOSTON, MASSACHUSETTS, A CORPORATION OF MAINE.

PAPER-FEEDER ELEVATOR.

No. 880,647.

Specification of Letters Patent.

Patented March 3, 1908.

Application filed August 4, 1905. Serial No. 272,774.

*To all whom it may concern:*

Be it known that I, KIMBALL BROWN FLETCHER, of Lancaster, in the county of Coos and State of New Hampshire, have invented certain new and useful Improvements in Paper-Feeder Elevators, of which the following is a specification.

This invention relates to a paper feeder elevator.

Figure 1:
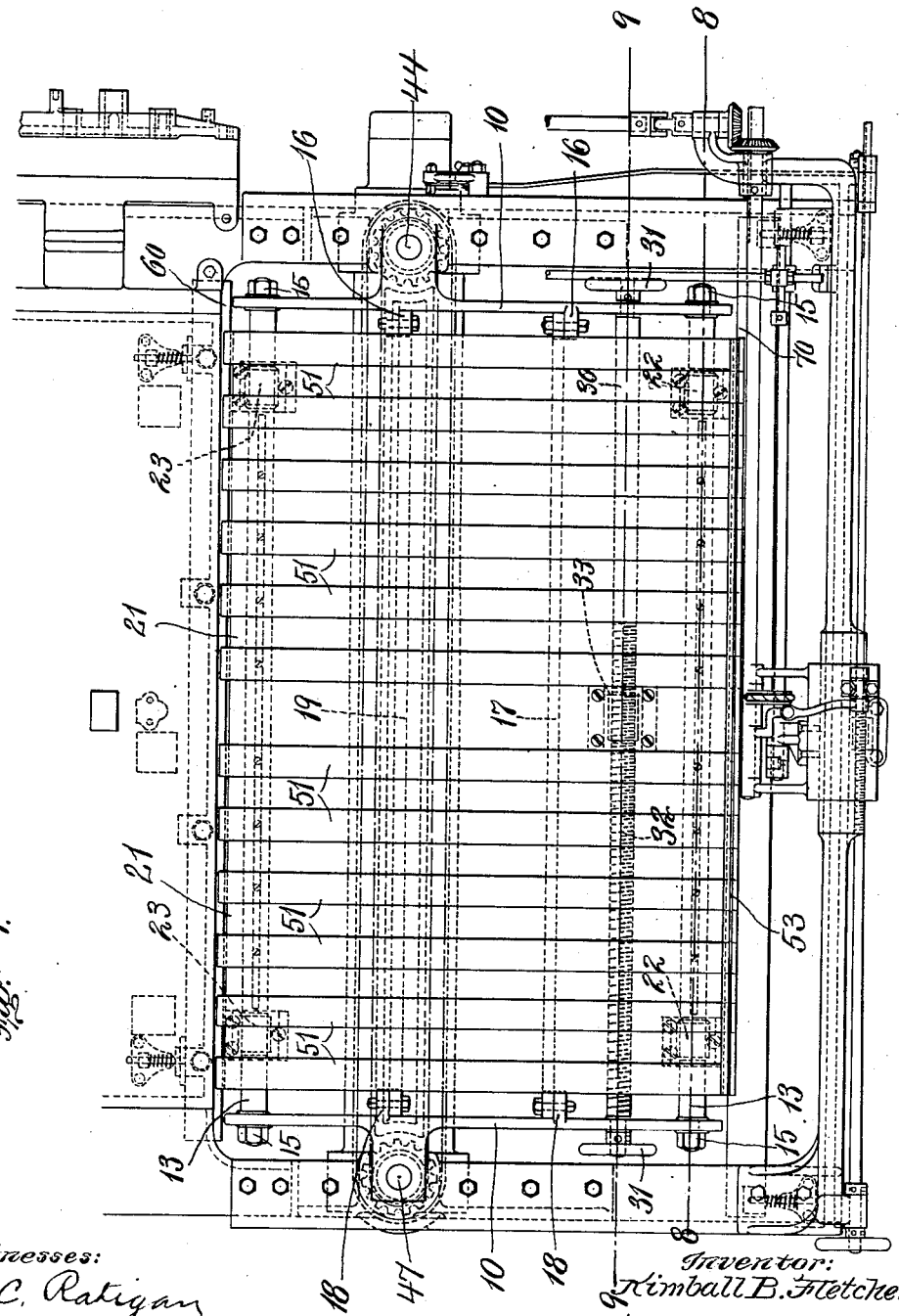
Figure 2:
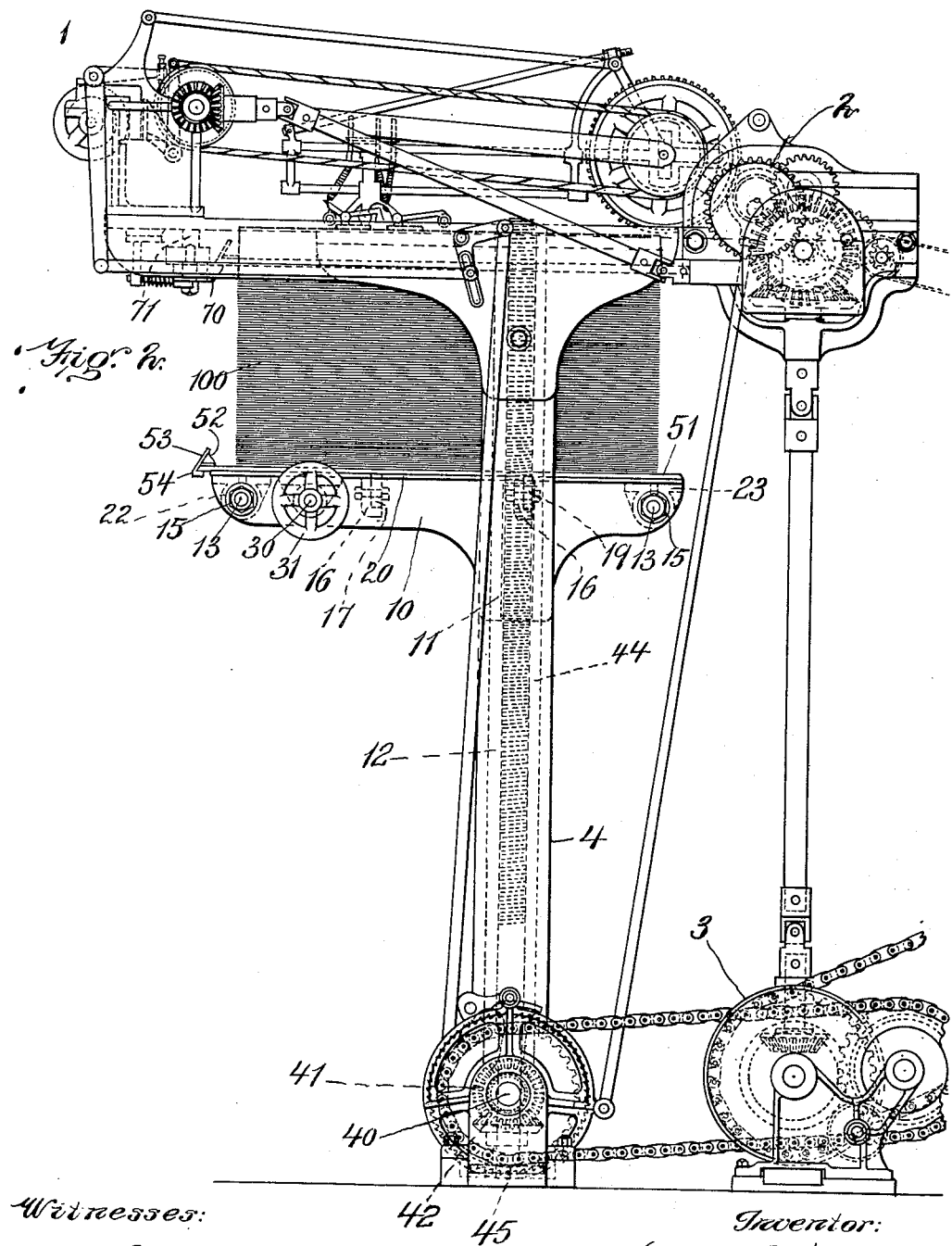
Figure 3:
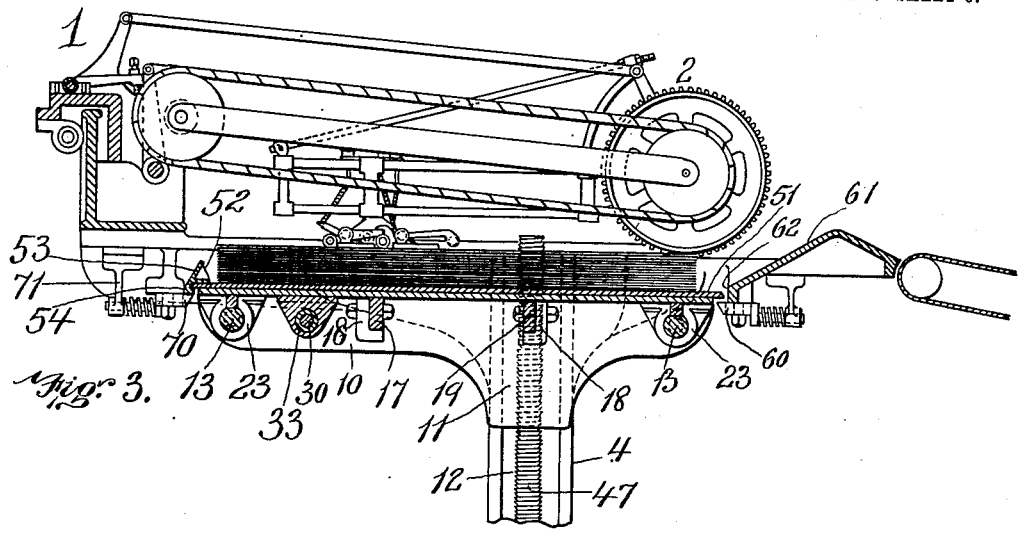
Figure 4:
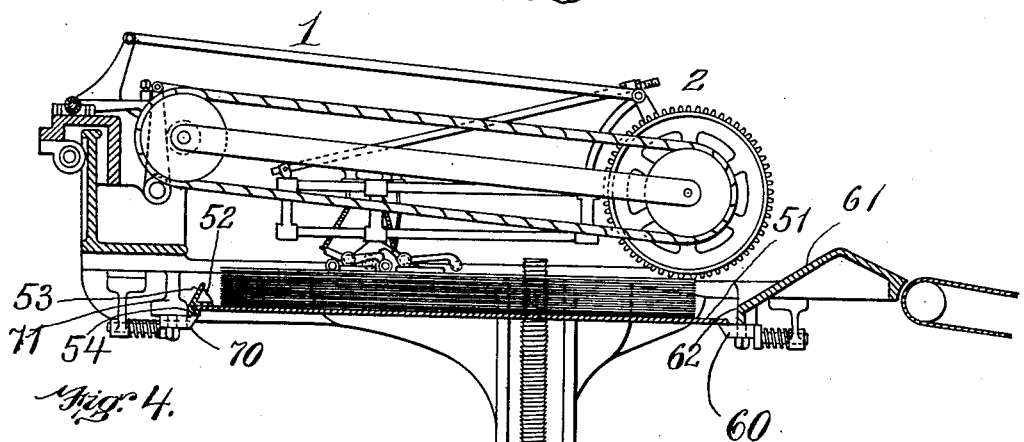

Figure 1 is a top plan view of a machine constructed in accordance with my invention. Fig. 2 is a side elevation of the same, showing the elevator platform carrying the grid, and a pile of sheets in position to be engaged by the paper feeder. Fig. 3 is a view similar to Fig. 2, partly in section, showing the elevator bed driven up beyond the point where the grid can be engaged by the latches and showing the pile of paper nearly depleted. Fig. 4 is a view similar to Fig. 3, showing the grid with its pile of paper supported only by the latches and the elevator bed returning on its downward trip for a new supply of paper. Fig. 5 is a view similar to Fig. 2, showing the arrangement of the parts, the pile of paper being shown by dotted lines. Fig. 6 is a detail view of the screws and nuts by which the elevator bed is raised and lowered. Fig. 7 is a detail view of the chain that connects the two elevator screws together. Fig. 8 is a cross-sectional view on the line 8—8 of Fig. 1, showing the guide-rod and sliding box of the elevator bed. Fig. 9 is a sectional view on line 9—9 of Fig. 1, showing the screw-shaft and its complemental lug by which the elevator bed is adjusted sidewise on the rods and lugs shown in Fig. 8. Fig. 10 is a detail view of a portion of the lower edge of the front of the framework, showing the latch for holding the front side of the grid, the grid being shown in dotted lines and in engagement with the under side of the latch to depress the latch, and in full lines on top of the latch, the latter being snapped beneath the grid. Fig. 11 is a view similar to Fig. 10, showing the grid and latch just before the grid has passed up high enought to permit the latch to snap under it. Fig. 12 is a view similar to Fig. 10, showing the latch for holding the rear side of the grid. Fig. 13 is a detail perspective view of the elevator platform and one of the elevator screws, this view also showing the adjusting screw to secure the sidewise position of the elevator platform. Fig. 14 is a detail perspective view of the grid. Fig. 15 is a top plan view of a portion of the grid head and two of its slats. Fig. 16 is a perspective view of the grid head and slats. Fig. 17 is a longitudinal sectional view running through the grid head and one of its slats as the same would appear if taken on the line 17—17 of Fig. 15.

The same letters of reference indicate the same parts in all of the figures.

In practice printing machines are provided with a feeding mechanism, comprising three well-recognized divisions: first: mechanism for feeding the paper into the printing-press, second: devices for picking the paper sheet by sheet off from a pile and delivering it to the feeding mechanism; and third: a device or elevator for raising piles of paper to the picking device, or sheet separator.

In practice the parts are arranged in the reverse order stated; that is to say, elevator, sheet separator, feeding device and printing-press.

My present invention concerns the elevator mechanism. The sheet-separating device 1, the gearing 2 by which the same is driven, and the power devices 3 for driving the elevator may be of any preferred construction, and are here shown merely for the sake of completeness.

The sheet-separating device 1 is supported by two columns 4, 4. The elevator bed is composed of two side plates 10, 10, each plate formed with a screw-threaded lug 11 arranged to slide in a complemental vertical guideway 12 in the columns 4. The side plates 10 (see Figs. 1 and 8) are held together by means of rods 13, there being one at each end. Each rod 13 as shown in Fig. 8 is reduced at its end to form a shoulder, the reduced portion passing through a suitable aperture in the plate 10, while a nut 15 pinches the plate between the nut and shoulder formed by the reduced portion. The side plates 10 are each formed with two lugs 16, 16, 18, 18.

17 represents a cross-bar connected at its ends to complemental lugs 16, 18 near the front end of the machine.

19 represents a similar cross-bar connected to the complemental lugs 16, 18, near the rear of the machine. The elevator bed is composed of a plate of metal 20 having thereon flat ribs 21 of any suitable material and shape, the ribs being spaced apart a sufficient distance to receive the members of the grid hereinafter described. To the front of the under side of the plate 20 are secured two lugs or boxes 22, loosely arranged upon the shaft 13.

23, 23 represent two boxes secured to the rear under side of the plate 20 and loosely arranged upon the complemental shaft 13.

30 represents a screw-threaded shaft having bearings in the plates 10 and equipped at each end with a hand-wheel 31. The screw-threads 32 of the shaft 30 engage complemental screw-threads in a nut 33 secured on the under side of the plate 20. By means of the hand-wheels 31 and described arrangement of the elevator bed with the shaft 30 and shafts 13, the elevator platform can be adjusted sidewise to properly position a pile of paper.

The power device 3 (Fig. 2) drives a shaft 40 having on its end a beveled gear 41 meshing with a beveled gear 42 rigidly mounted upon a screw 44 arranged in the right hand guideway 12 (see Fig. 6). 45 represents a sprocket gear fast on the screw 44 below the gear 42. 46 represents a complemental sprocket gear fast on the screw 47 that is arranged in the guideway 12 of the opposite column 4. 48 represents a sprocket-chain connecting two gears 45, 46. By this means the screws 44 and 47 are driven in unison and in the same direction, the screw 44 engaging the lug 11 at the right hand end of the machine, while the screw 47 engages the lug 11 at the left hand end of the machine, thereby providing means whereby the elevator platform is raised and lowered at any desired height within the capacity of the screws.

Referring to Fig. 14, 51 represents a series of metal slats suitably connected to the head 52, the slats 51 and head 52 constituting a grid, the slats 51 being of such size and so spaced apart that they will slide upon the elevator bed 20 on top of the platform between the ribs 21, the slats 51 being of the same or less thickness than the ribs 21. As shown, the head 52 is formed with a bevel 53, and in Fig. 17, the bevel 53 below the plane of the slats 51 is formed with a vertical shoulder 54, the bevel 53 being superimposed over the shoulder 54, when the parts are in their operative position, (see Fig. 4).

Referring to Figs. 5, 10, 11, and 12, 60 represents a spring catch or bar supported on the rear under side of the framework of the mechanism 1, and extending crosswise of said framework. The part 61 just above the latch 60 is formed with a vertical shoulder 62. 70 represents a complemental latch connected to the under side of the framework-supporting mechanism 1 near the front, by means of castings or lugs 71.

As the elevator carries up its load or pile of sheets 100, the mechanism 1 separates the sheets one at a time, delivering them to the feeding mechanism, not shown, the feeding action of the elevator and the mounting of the separating mechanism being so arranged that the feeding action of the elevator does not interfere with the separating mechanism. As the elevator rises the bevel 53 comes into engagement with the latch 70, while the beveled ends 75 of the slats 51, (see Fig. 4) come into engagement with the latch 60, the upper sides of the latches 60 and 70 being in the same plane. The motion of the platform upward tends to move the latches 60 and 70 away from each other. As the platform passes the latch 60 the latter snaps under the beveled ends 75 of the slats 51, (see Fig. 12). Further movement of the platform permits the latch 70 to snap under the head 53 and shoulder 54 of the grid (see Fig. 10). In Fig. 11 is shown the position of the parts just before the latch 70 snaps under the shoulder 54 and while the latch 60 is snapped under the beveled ends 75 of the slats 51.

By the arrangement shown in Fig. 4, and also Figs. 5, 10, 11, 12, 14, 15, 16, and 17, the shoulder 54 on the head of the grid cooperating with the latch 70, while the bevel 75 at the other end of the grid is acted upon by the latch 60, prevents longitudinal movement, or movement of the grid too far to the left (see Figs 10 and 12). The movement of the grid too far to the right, or in the opposite direction, by reason of the action of the latch 70, is prevented by the shoulder 62 (see Figs. 12 and 3). By the described construction, the grid is maintained against longitudinal displacement, so that when it has been forced to the required height, it would be supported at one end by the latch 60, and at the other end by the latch 70. The latches 60 and 70 are shown as bars running across the machine.

Having thus explained the nature of my invention and described a way of constructing and using the same, though without attempting to set forth all of the forms in which it may be made, or all of the modes of its use, what I claim and desire to secure by Letters Patent is:—

1. In a machine for feeding independent sheets of paper, an elevator platform, a grid comprising a series of connected slats, yielding latches arranged to retain the grid stationary in its elevated position after the removal of the elevator platform.

2. In a machine of the character specified, an elevator platform and means for operating the latter, a removable grid the slats of which are adapted to lie in complemental recesses in said platform, two opposed latches located near the upper end of the travel of the platform, and between which the grid is arranged to be carried, and complemental members on the grid and framework to prevent displacement of the grid due to the action of the latches.

3. In a machine of the character specified, an elevator platform formed with grooves, a removable grid adapted to have its slats arranged in said grooves, a pair of opposed latches, each arranged below a shoulder, a shoulder upon one end of said grid whereby as said grid is forced between said latches the latter are constrained to snap under the grid and the latter is held against displacement due to the action of the latches.

4. A grid comprising a series of slats, a head to which one end of each slat is secured, said head being formed with a vertical and a superimposed surface or part.

5. In a machine of the character specified, an elevator mechanism, an elevator platform, a grid adapted to be carried thereby, latches for holding said grid independent of the platform and provisions on the grid and framework to prevent movement of the grid when engaged by said latches.

6. In a machine of the character specified, an elevator platform and means for operating the latter, a removable grid, the slats of which are adapted to lie in complemental recesses in said platform, two opposed latches between which the grid is arranged to be carried by the platform, and means on the grid and framework for causing one latch at a time to snap under said grid.

7. In a machine of the character specified, an elevator platform and means for operating the latter, a removable grid comprising a head and a series of independent slats confined only at one end, a pair of opposed latches, one of which is formed of a bar of corresponding length to the width of the grid, and provisions whereby as the grid passes the plane of said latches they are snapped under said grid, the free ends of the slats being engaged by the said bar.

8. In a machine of the character specified, an elevator platform and means for operating the latter, a removable grid composed of a head and a series of independent slats, each connected at one end to said head, the said head and slats being formed upon their top side with bevels, a pair of opposed latches beveled on their under sides, and provisions whereby the said grid is carried by the plane of said latches and the latter are snapped beneath the grid to sustain the latter upon the withdrawal of the elevator platform.

In testimony whereof I have affixed my signature, in presence of two witnesses.

KIMBALL BROWN FLETCHER.

Witnesses:
H. L. ROBBINS,
E. BATCHELDER.